US010823302B2

United States Patent
Waddell et al.

(10) Patent No.: US 10,823,302 B2
(45) Date of Patent: Nov. 3, 2020

(54) GLOBE BUTTERFLY VALVE

(71) Applicant: United Technologies Corporation, Farmington, CT (US)

(72) Inventors: Matthew C. Waddell, Brimfield, MA (US); Jesse W. Clauson, Agawam, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/123,336

(22) Filed: Sep. 6, 2018

(65) Prior Publication Data

US 2020/0080658 A1    Mar. 12, 2020

(51) Int. Cl.
| | | |
|---|---|---|
| *F16K 27/02* | (2006.01) | |
| *F16K 15/03* | (2006.01) | |
| *F16K 31/00* | (2006.01) | |
| *F16K 1/22* | (2006.01) | |
| *F16K 1/226* | (2006.01) | |

(Continued)

(52) U.S. Cl.
CPC .......... *F16K 27/0218* (2013.01); *F01D 11/22* (2013.01); *F16K 1/221* (2013.01); *F16K 1/226* (2013.01); *F16K 1/2263* (2013.01); *F16K 11/165* (2013.01); *F16K 15/038* (2013.01); *F16K 31/00* (2013.01); *Y10T 137/87161* (2015.04); *Y10T 137/87692* (2015.04); *Y10T 137/87708* (2015.04); *Y10T 137/87724* (2015.04); *Y10T 137/87772* (2015.04)

(58) Field of Classification Search
CPC .... F16K 1/2263; F16K 27/0218; F16K 1/226; F16K 11/165; Y10T 137/87692; Y10T 137/87161; Y10T 137/87708; Y10T 137/87724; Y10T 137/87772; F01D 11/22

See application file for complete search history.

(56) References Cited

U.S. PATENT DOCUMENTS

| 1,270,722 A * | 6/1918 | Gillette | ............... F16K 7/06 137/595 |
|---|---|---|---|
| 2,886,062 A | 5/1959 | Wheatley | |

(Continued)

FOREIGN PATENT DOCUMENTS

| DE | 1253279 B | 11/1967 | |
|---|---|---|---|
| EP | 0848154 A2 * | 6/1998 | ....... F02M 35/10255 |

(Continued)

OTHER PUBLICATIONS

EP Application No. 19195671.3 Extended EP Search Report dated Jan. 31, 2020, 7 pages.

*Primary Examiner* — Atif H Chaudry
(74) *Attorney, Agent, or Firm* — Cantor Colburn LLP

(57) ABSTRACT

An aspect includes a globe butterfly valve that includes a valve inlet, a valve outlet, a globe housing with a spherical body between the valve inlet and the valve outlet, and a globe butterfly valve disc operably disposed within the globe housing. The globe housing has a larger interior diameter than an inlet diameter of the valve inlet and an outlet diameter of the valve outlet. The globe butterfly valve disc is configured to block a flow path between the valve inlet and the valve outlet responsive to an outer edge of the globe butterfly valve disc being positioned proximate to an interior surface of the globe housing between the valve inlet and the valve outlet.

20 Claims, 7 Drawing Sheets

(51) Int. Cl.
    *F16K 11/16*    (2006.01)
    *F01D 11/22*    (2006.01)

(56)         References Cited

U.S. PATENT DOCUMENTS 3,128,785  A        4/1964   Krummel
    4,058,093  A       11/1977   Kohno et al.
    4,774,977  A  *   10/1988    Cohen ................. F16K 11/0525
                                                                137/271
    9,657,843  B2      5/2017   Lallemant et al.
  2017/0002938 A1      1/2017   Wortmann
  2017/0114657 A1      4/2017   Hussain et al.

FOREIGN PATENT DOCUMENTS

EP          08489154  A2      6/1998
  EP           2806197  A2     11/2014

* cited by examiner

GLOBE BUTTERFLY VALVE

BACKGROUND

The subject matter disclosed herein generally relates to flow control systems and, more particularly, to a method and apparatus for a globe butterfly valve.

Pneumatic systems, such as airflow control systems on an aircraft, can use multiple valves with multiple actuators to control delivery of an airflow for various purposes. Components receiving the airflow may have different requirements for timing or conditions under which the airflow should be received. Using a dedicated actuator for each valve to be controlled can support a wide range of control sequences between multiple valves; however, each actuator adds weight and complexity to the overall system.

BRIEF DESCRIPTION

According to one embodiment, a globe butterfly valve includes a valve inlet, a valve outlet, a globe housing with a spherical body between the valve inlet and the valve outlet, and a globe butterfly valve disc operably disposed within the globe housing. The globe housing has a larger interior diameter than an inlet diameter of the valve inlet and an outlet diameter of the valve outlet. The globe butterfly valve disc is configured to block a flow path between the valve inlet and the valve outlet responsive to an outer edge of the globe butterfly valve disc being positioned proximate to an interior surface of the globe housing between the valve inlet and the valve outlet.

In addition to one or more of the features described above or below, or as an alternative, further embodiments may include where the globe butterfly valve disc includes a pivot point, and the globe butterfly valve disc is operable to rotate about the pivot point within the globe housing.

In addition to one or more of the features described above or below, or as an alternative, further embodiments may include where the interior surface of the globe housing forms a hysteresis region of rotation that blocks the flow path during rotation of the globe butterfly valve disc within the hysteresis region.

In addition to one or more of the features described above or below, or as an alternative, further embodiments may include where a full flow area between the valve inlet and the valve outlet is provided responsive to rotation of the globe butterfly valve disc by about ninety degrees from a midpoint of the hysteresis region.

According to another embodiment, a dual valve system includes a valve body, a valve disc operably disposed within the valve body, a globe housing comprising a spherical body, a globe butterfly valve disc operably disposed within the globe housing, and a linkage system operably coupled to the valve disc and the globe butterfly valve disc. The globe housing differs in geometry from the valve body such that opening of a first flow area between the valve disc and the valve body occurs prior to opening of a second flow area between to the globe butterfly valve disc and the globe housing responsive to movement of the linkage system.

In addition to one or more of the features described above or below, or as an alternative, further embodiments may include a first pneumatic tube coupled to the valve body and configured to receive a first airflow from a gas turbine engine, and a second pneumatic tube coupled to the globe housing and configured to receive a second airflow from the gas turbine engine.

In addition to one or more of the features described above or below, or as an alternative, further embodiments may include where the first flow area controls delivery of the first airflow to a first airflow use, and the second flow area controls delivery of the second airflow to a second airflow use.

In addition to one or more of the features described above or below, or as an alternative, further embodiments may include where the valve body and the globe housing are arranged substantially parallel to each other.

In addition to one or more of the features described above or below, or as an alternative, further embodiments may include where the interior surface of the globe housing forms a hysteresis region of rotation that blocks the second flow area during rotation of the globe butterfly valve disc within the hysteresis region.

In addition to one or more of the features described above or below, or as an alternative, further embodiments may include where the second flow area is maximized responsive to rotation of the globe butterfly valve disc by about ninety degrees from a midpoint of the hysteresis region.

In addition to one or more of the features described above or below, or as an alternative, further embodiments may include where the globe housing is between a valve inlet and a valve outlet, the globe housing having a larger interior diameter than an inlet diameter of the valve inlet and an outlet diameter of the valve outlet.

In addition to one or more of the features described above or below, or as an alternative, further embodiments may include where the globe housing has a larger interior diameter than the valve body.

In addition to one or more of the features described above or below, or as an alternative, further embodiments may include where the valve body and the valve disc form a first butterfly valve, and the globe housing and the globe butterfly valve disc form a second butterfly valve.

In addition to one or more of the features described above or below, or as an alternative, further embodiments may include an actuator operably coupled to the linkage system.

According to another embodiment, a method of operating a dual valve system includes driving a valve disc to rotate in a valve body using an actuator and translating a rotational force of the actuator through a linkage system operably coupled to the valve disc and a globe butterfly valve disc. The globe butterfly valve disc is disposed within a globe housing such that opening of a first flow area between the valve disc and the valve body occurs prior to opening of a second flow area between to the globe butterfly valve disc and the globe housing responsive to the rotational force.

A technical effect of the apparatus, systems and methods is achieved by providing a globe butterfly valve as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
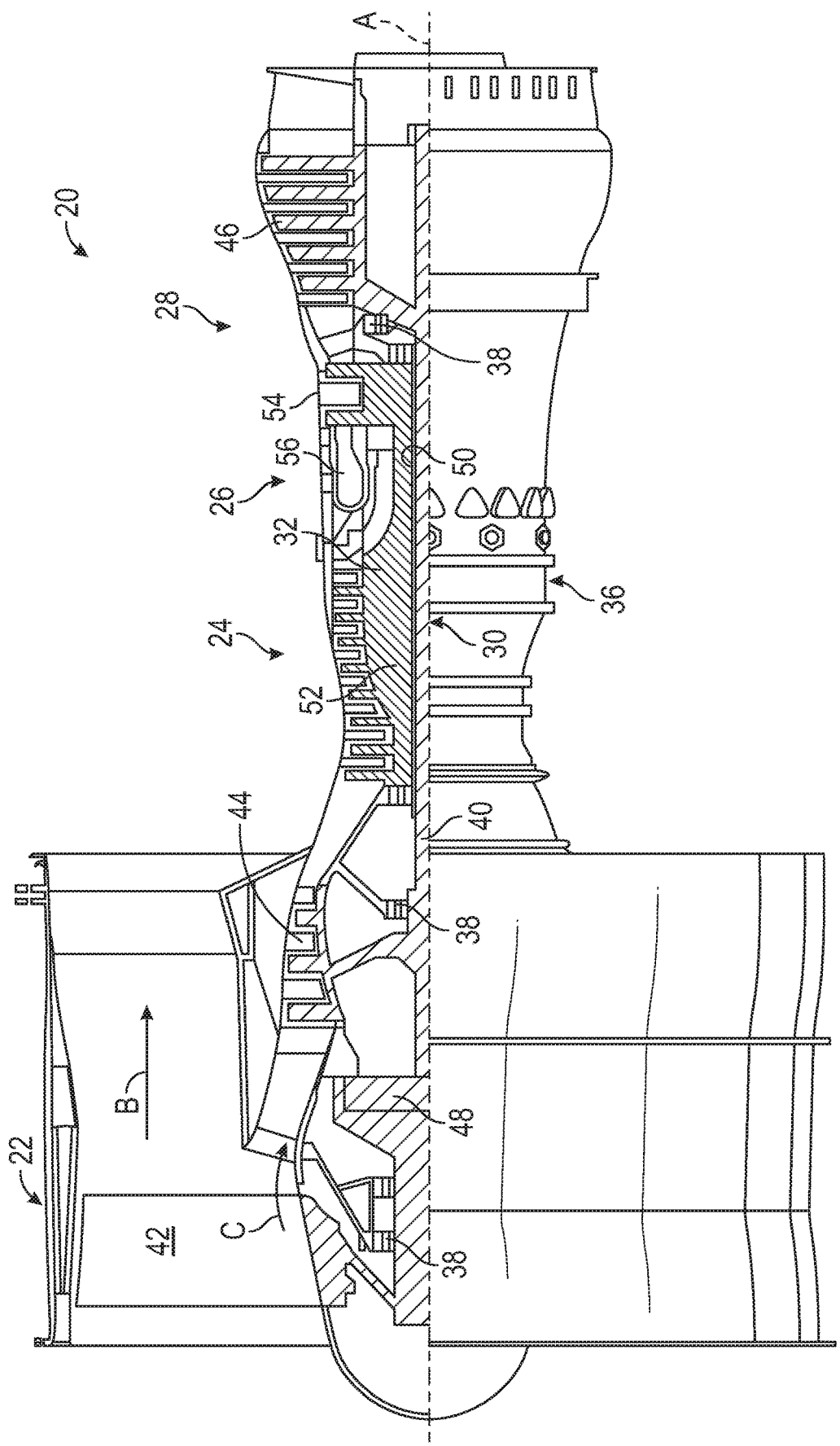
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
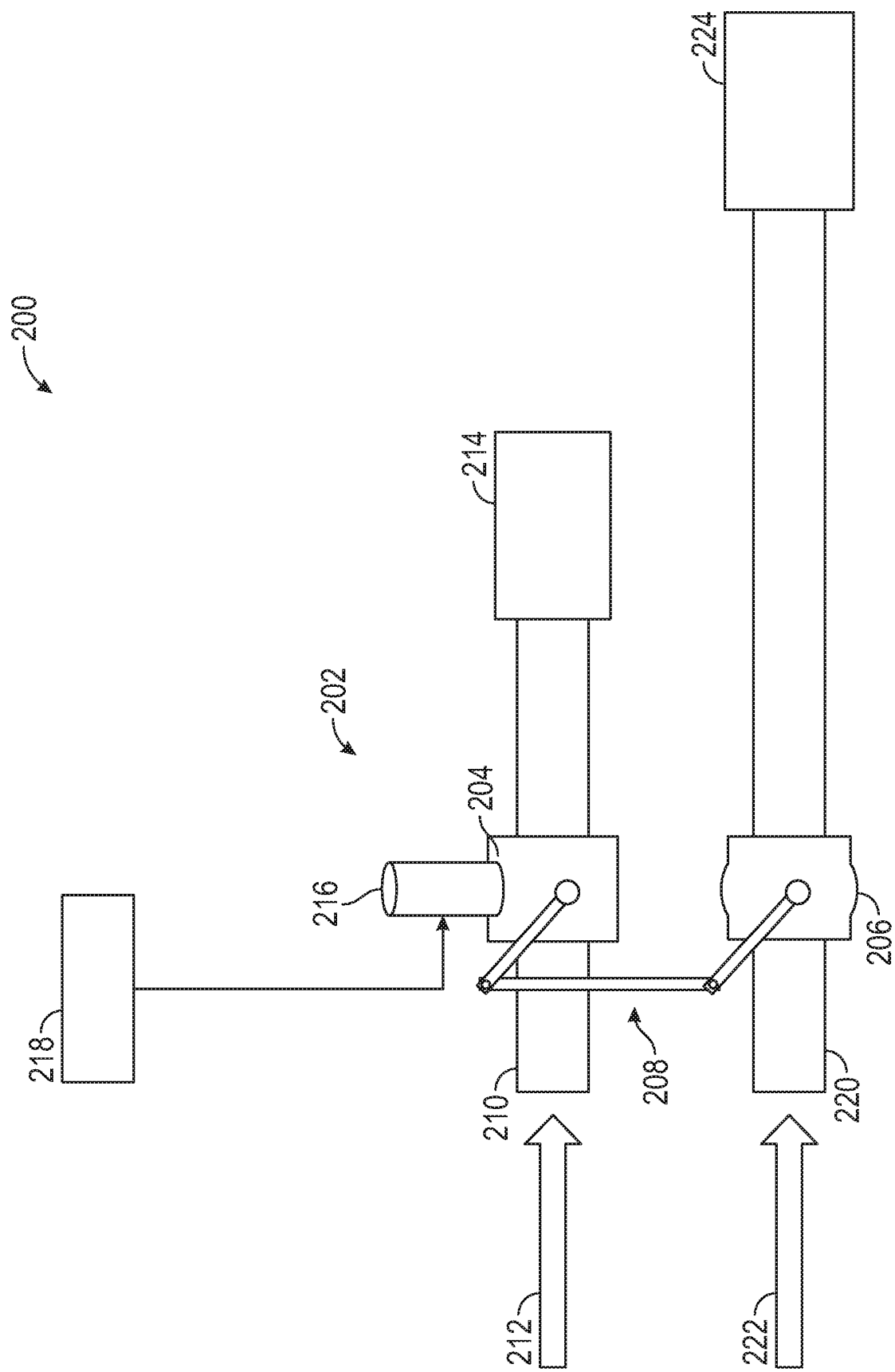
FIG. 2 is a schematic diagram of a pneumatic system including a dual valve system, in accordance with an embodiment of the disclosure.

FIG. 2 illustrates a pneumatic system 200 that includes a dual valve system 202 with a first valve 204 operably coupled to a second valve 206 by a linkage system 208. In the example of FIG. 2, the first valve 204 can be referred to as butterfly valve 204 (or valve 204), and the second valve 206 can be referred to as globe butterfly valve 206. The first valve 204 is fluidly coupled to a first pneumatic tube 210 configured to receive a first airflow 212 from an air source, such as an airflow of the gas turbine engine 20 of FIG. 1. The first valve 204 selectively enables a first airflow use 214 to receive all, a portion, or substantially none of the first airflow 212 through the first pneumatic tube 210 responsive to an actuator 216. Similarly, the second valve 206 is fluidly coupled to a second pneumatic tube 220 configured to receive a second airflow 222 from an air source, such as an airflow of the gas turbine engine 20 of FIG. 1. The second valve 206 selectively enables a second airflow use 224 to receive all, a portion, or substantially none of the second airflow 222 through the second pneumatic tube 220 responsive to the actuator 216. In the example of FIG. 2, the first valve 204 can be directly driven by the actuator 216, while the second valve 206 is driven through the linkage system 208 responsive to a rotational force of the actuator 216.

A controller 218 can control operation of the actuator 216, where the controller 218 may also control other system aspects, such as controlling operation of the gas turbine engine 20 of FIG. 1. In embodiments, the controller 218 can include a processing system, a memory system, an input/output interface, and other such systems known in the art.

As one example configuration, the pneumatic system 200 can supply the first airflow 212 and the second airflow 222 for active clearance control of the gas turbine engine 20 of FIG. 1. Active clearance control can reduce blade tip to shroud clearance within the gas turbine engine 20 by regulating thermal expansion of engine structures through controlled delivery of cooling air to targeted locations. The first valve 204 and the second valve 206 may each have different characteristics to establish a specific flow split relationship between the first airflow use 214 and the second airflow use 224. For instance, the first airflow use 214 can provide cooling air to a portion of the high pressure turbine 54 of FIG. 1, and the second airflow use 224 can provide cooling air to a portion of the low pressure turbine 46 of FIG. 1. In embodiments, the first airflow 212 and the second airflow 222 may originate from a common portion of the gas turbine engine 20, such as an engine bleed of the compressor section 24 and/or bypass air from the fan section 22 of FIG. 1. Using a flow split relationship that allows cooling air of the first airflow 212 to reach the first airflow use 214 prior to allowing cooling air of the second airflow 222 to reach the second airflow use 224 may increase performance and TSFC of the gas turbine engine 20. The linkage system 208 can enable a single instance of the actuator 216 to control the state of the first valve 204 and the second valve 206, while delayed opening of the second valve 206 relative to the first valve 204 may be achieved, for example, by geometric differences between components within the first valve 204 and the second valve 206, as further described herein.

Figure 3:
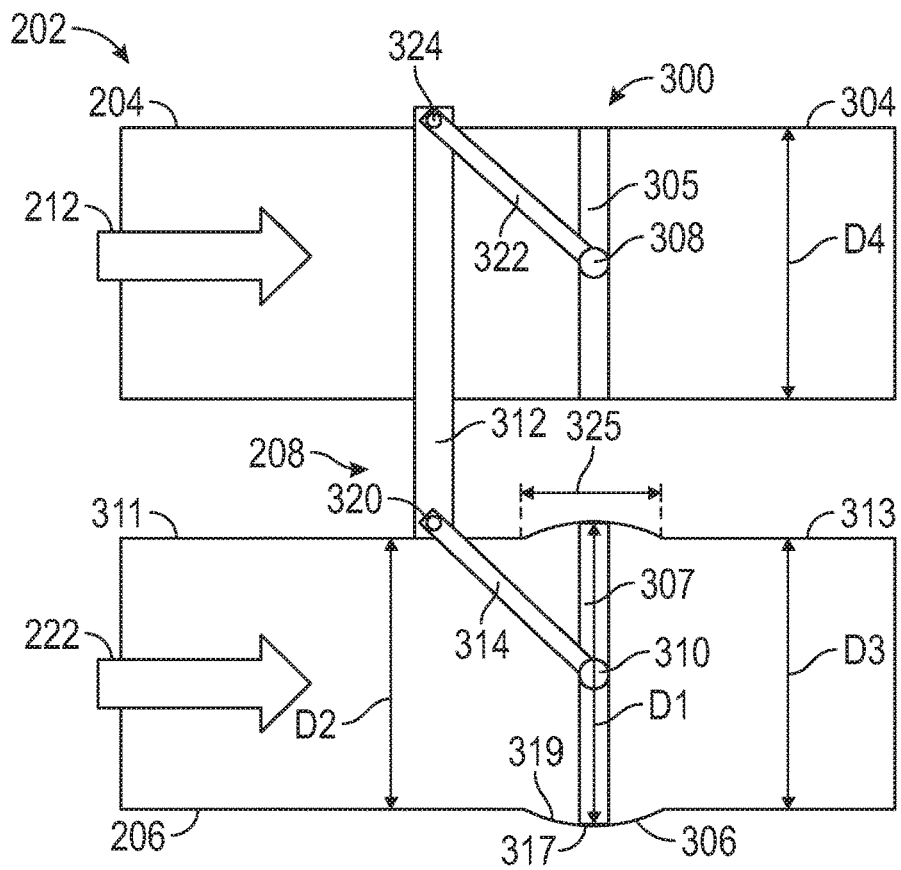
FIG. 3 is a schematic diagram of a dual valve system in a first state, in accordance with an embodiment of the disclosure.
Figure 4:
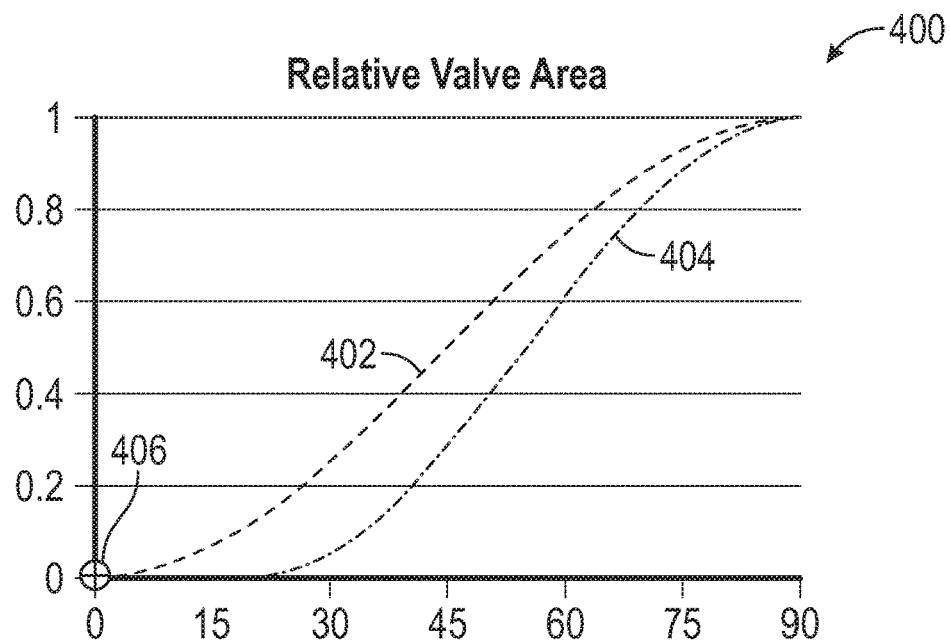
FIG. 4 is a plot of relative valve area, in accordance with an embodiment of the disclosure.

FIG. 3 is a schematic diagram of the dual valve system 202 in greater detail in a first state 300 according to an embodiment. The first valve 204 and the second valve 206 may each be a butterfly valve (e.g., a first butterfly valve and a second butterfly valve with a globe housing portion). The first valve 204 can include a first valve body 304 and a first valve disc 305 operably disposed within the first valve body 304. The second valve 206 can include a second valve body 306 and a second valve disc 307 operably disposed within the second valve body 306. The second valve body 306 can have a different geometry than the first valve body 304. The second valve body 306 can also be referred to as a globe housing 306 including a spherical body between a valve inlet 311 and a valve outlet 313. The globe housing 306 can have a larger interior diameter D1 than an inlet diameter D2 of the valve inlet 311 and an outlet diameter D3 of the valve outlet 313. In some embodiments, the inlet diameter D2 of the valve inlet 311 and the outlet diameter D3 of the valve outlet 313 can be equal to an interior diameter D4 of the first valve body 304. Thus, the interior diameter D1 of the globe housing 306 can be larger than the interior diameter D4 of the first valve body 304, and the diameter of the second valve disc 307 (also referred to as globe butterfly valve disc 307) can be greater than the diameter of the first valve disc 305.

The linkage system 208 can be operably coupled to the first valve disc 305 at a first pivot point 308 and coupled to the second valve disc 307 at a second pivot point 310. The linkage system 208 includes an armature 312 coupled to a first crank linkage 314 at third pivot point 320, where the first crank linkage 314 is further coupled to the second pivot point 310. The linkage system 208 can also include a second crank linkage 322 operably coupled to the armature 312 at a fourth pivot point 324 and at the first pivot point 308 of the first valve disc 305.

The first valve body 304 and the second valve body 306 can be arranged substantially parallel to each other. The second valve body 306 can differ in geometry from the first valve body 304 such that opening of a first flow area (e.g., first flow area 502, 702 of FIGS. 5 and 7) between the first valve body 304 and the first valve disc 305 occurs prior to opening of a second flow area (e.g., second flow area 504, 704 of FIGS. 5 and 7) between the second valve body 306 and the second valve disc 307 responsive to movement of the linkage system 208. For instance, the first valve body 304 can have a substantially uniform interior diameter D4 while the second valve 206 can vary in diameter between the valve inlet 311, the globe housing 306, and the valve outlet 313. The globe butterfly valve disc 307 is configured to block a flow path (e.g., of second airflow 222) between the valve inlet 311 and the valve outlet 313 responsive to an outer edge 317 of the globe butterfly valve disc 307 being positioned proximate to an interior surface 319 of the globe housing 306 between the valve inlet 311 and the valve outlet 313. The interior surface 319 of the globe housing 306 forms a hysteresis region 325 of rotation that blocks the flow path during rotation of the globe butterfly valve disc 307 within the hysteresis region 325. Thus, while the outer edge 317 (or a seal member attached thereto) contacts the interior surface 319, the second airflow 222 is substantially blocked from reaching the valve outlet 313. The travel length along an arc formed by the interior surface 319 of globe housing 306 results in a delayed opening of the second valve 206 relative to the first valve 204.

The first state 300 of the dual valve system 202 in FIG. 3 is depicted with both the first valve disc 305 and the second valve disc 307 fully closed at a position of zero degrees, as further illustrated in plot 400, where a first relative valve area 402 of the first valve 204 (e.g., scaled between 0 and 1) is depicted for a range of angles of the first valve disc 305 pivoting with respect to the first valve body 304 between zero and ninety degrees. The plot 400 also depicts an example of the delay of a second relative valve area 404 of the second valve 206 for a range of angles of the second valve disc 307 pivoting with respect to the second valve body 306 between zero and ninety degrees. A marker 406 on plot 400 indicates the state of the first valve 204 and the second valve 206 as configured in FIG. 3, e.g., both at a position of zero degrees and fully closed. It will be understood that the plot 400 is merely one example of a possible delay relationship between first valve 204 and the second valve 206, and other variations are contemplated.

Figure 5:
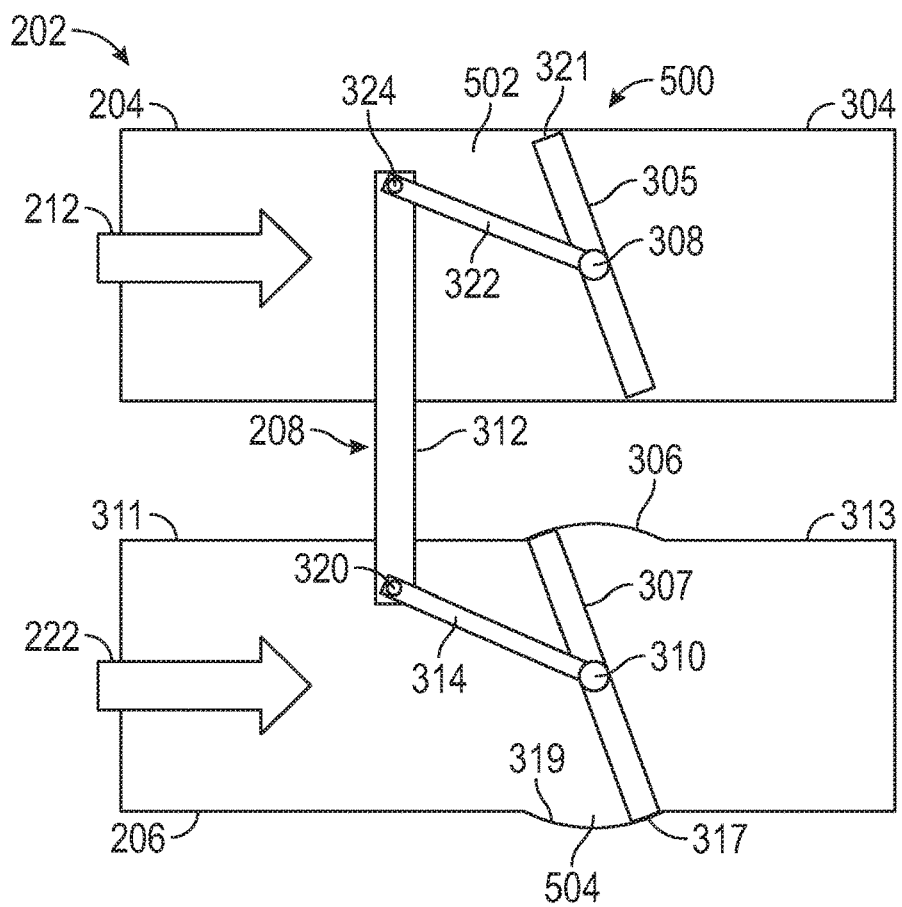
FIG. 5 is a schematic diagram of a dual valve system in a second state, in accordance with an embodiment of the disclosure.
Figure 6:
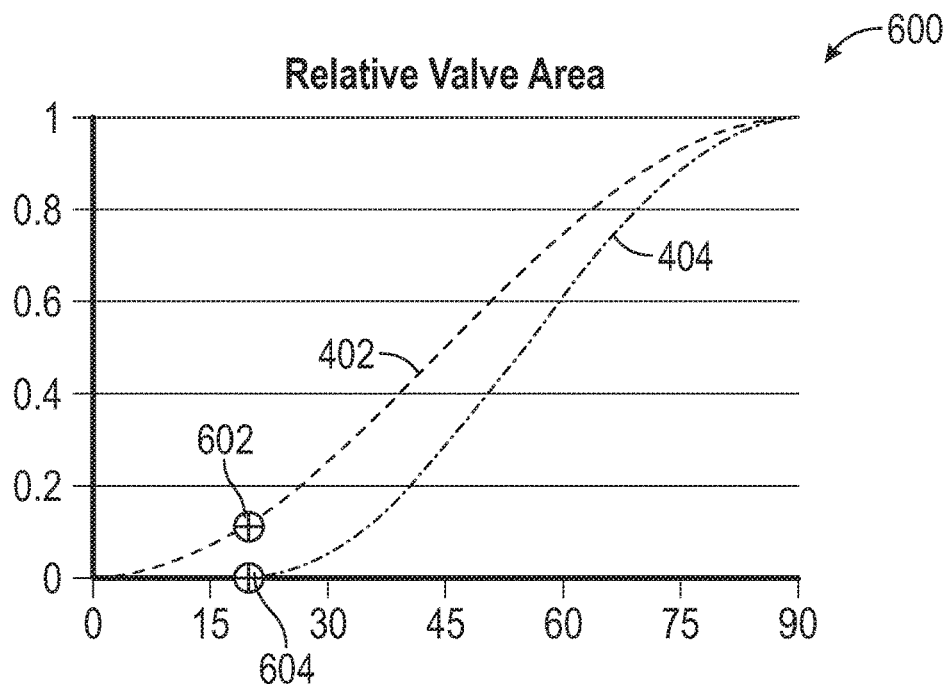
FIG. 6 is a plot of relative valve area, in accordance with an embodiment of the disclosure.

FIG. 5 depicts a second state 500 of the dual valve system 202 as another example, where the first valve disc 305 and the second valve disc 307 are both rotated to a position of about 20 degrees relative to the first valve body 304 and the second valve body 306 about pivot points 308, 310 respectively. An outer edge 321 of the first valve disc 305 forms a first flow area 502 with respect to the first valve body 304 and the outer edge 317 of the second valve disc 307 forms a second flow area 504 with respect to the interior surface 319 of the globe housing 306. In an example plot 600 of FIG. 6, it can be seen that the second state 500 may result in a first relative valve area 402 of about 10% at marker 602, which allows a portion of the first airflow 212 to pass through the first valve 204 towards the first airflow use 214 of FIG. 2. However, the second valve 206 remains with a very small (near 0%) value for the second relative valve area 404 as seen at marker 604 on the example plot 600.

Figure 7:
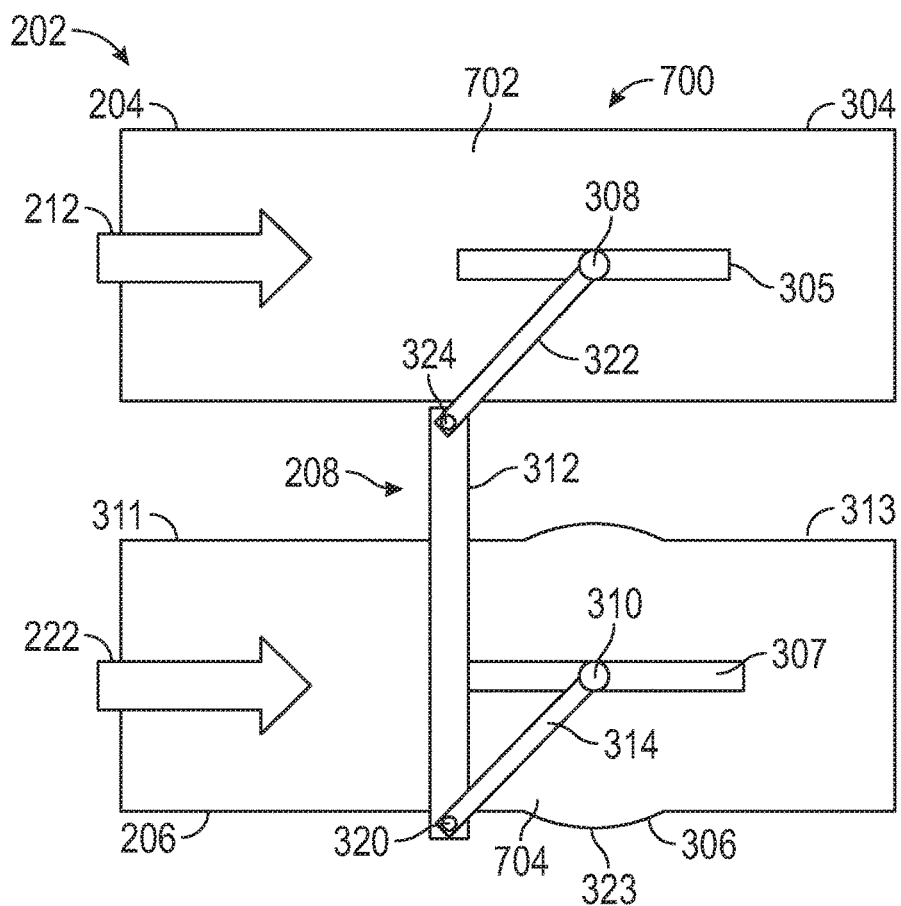
FIG. 7 is a schematic diagram of a dual valve system in a third state, in accordance with an embodiment of the disclosure.
Figure 8:
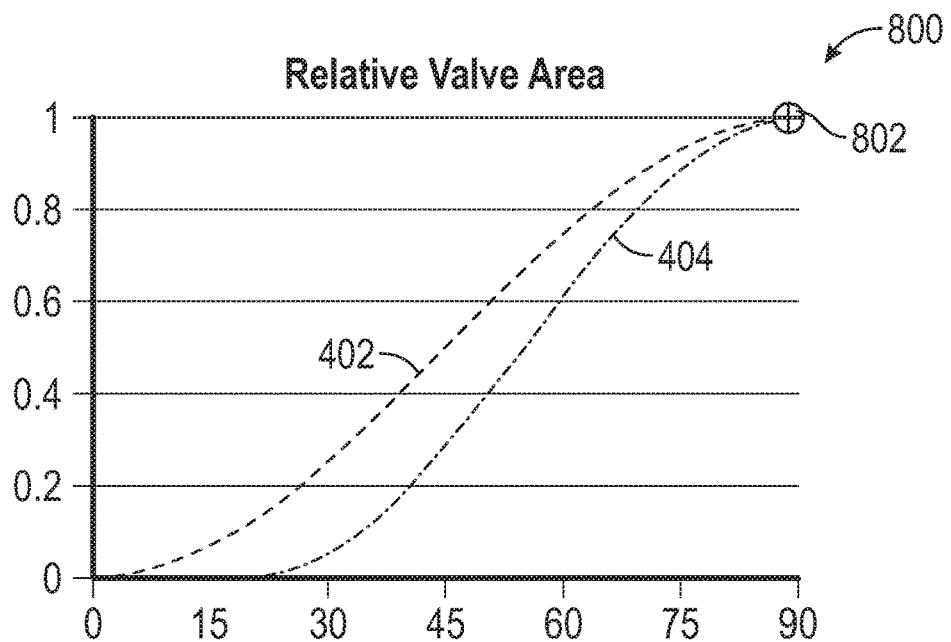
FIG. 8 is a plot of relative valve area, in accordance with an embodiment of the disclosure.

FIG. 7 depicts a third state 700 of the dual valve system 202 as another example, where the first valve disc 305 and the second valve disc 307 are both rotated to a position of about 90 degrees (e.g., maximum open) relative to the first valve body 304 and the second valve body 306 about pivot points 308, 310 respectively. A first flow area 702 is formed between the first valve disc 305 and the first valve body 304, and a second flow area 704 is formed between the second valve disc 307 and the second valve body 306. In an example plot 800 of FIG. 8, it can be seen that the third state 700 may result in a first relative valve area 402 of about 100% at marker 802, which allows the first airflow 212 to pass through the first valve 204 towards the first airflow use 214 of FIG. 2. The second valve 206 is also opened with the second relative valve area 404 of about 100% at marker 802, which allows the second airflow 222 to pass through the second valve 206 towards the second airflow use 224 of FIG. 2. Thus, after the second valve disc 307 rotates past the globe housing 306, both the first valve 204 and the second valve 206 can reach a fully opened state upon rotation of about 90 degrees from a midpoint 323 of the hysteresis region 325 formed by the globe housing 306.

Figure 9:
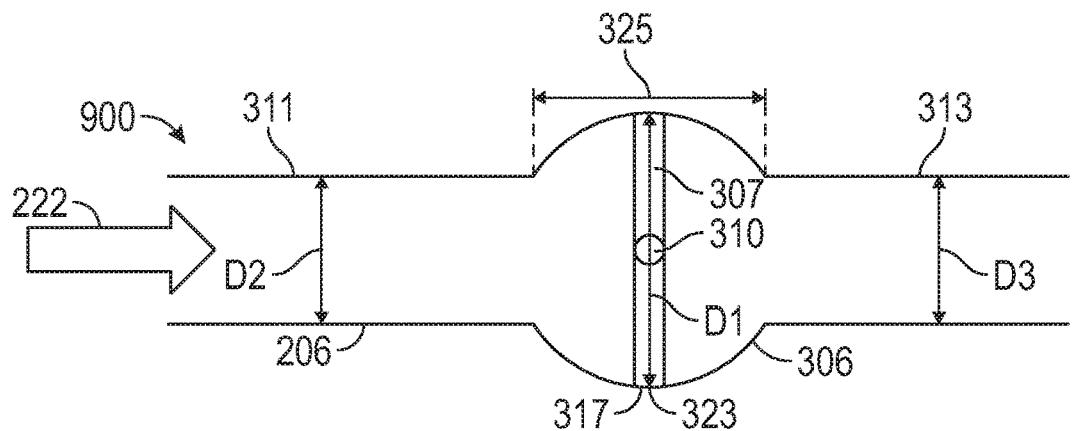
FIG. 9 is a schematic diagram of a globe butterfly valve in a first state, in accordance with an embodiment of the disclosure.
Figure 10:
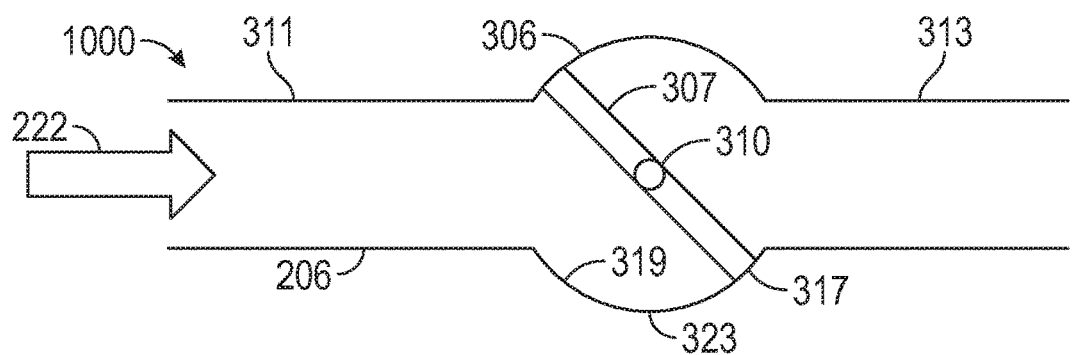
FIG. 10 is a schematic diagram of a globe butterfly valve in a second state, in accordance with an embodiment of the disclosure.
Figure 11:
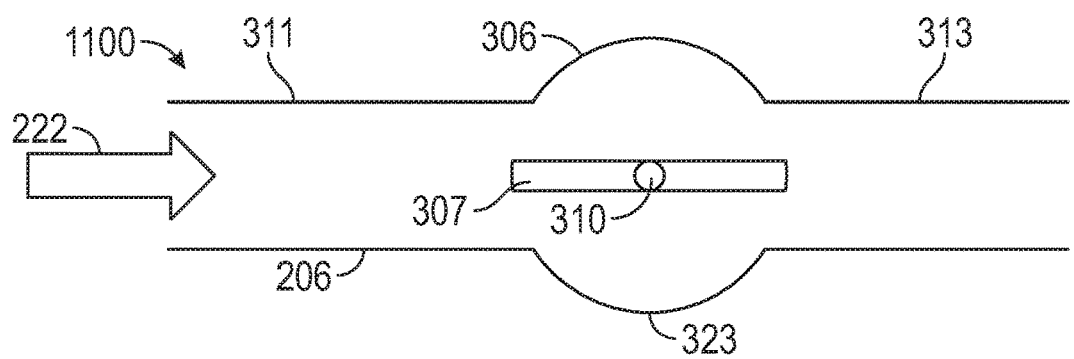
FIG. 11 is a schematic diagram of a globe butterfly valve in a third state, in accordance with an embodiment of the disclosure.

The rotation path and relationships of the globe butterfly valve 206 are depicted in FIGS. 9, 10, and 11 in a first state 900, second state 1000, and a third state 1100. The first state 900 depicts an example of the globe butterfly valve 206 in a closed state similar to the example of the first state 300 of FIG. 3, where the outer edge 317 of the globe butterfly valve disc 307 substantially aligns with the midpoint 323 of the hysteresis region 325 formed by the globe housing 306. The second state 1000 depicts an example of the globe butterfly valve 206 in a rotated flow blocking state similar to the example of the second state 500 of FIG. 5, where the outer edge 317 of the globe butterfly valve disc 307 still contacts the interior surface 319 of the globe housing 306 but no longer aligns with the midpoint 323 of the hysteresis region 325 formed by the globe housing 306. The third state 1100 depicts an example of the globe butterfly valve 206 in a fully opened state similar to the example of the third state 700 of FIG. 7, where a full flow area between the valve inlet 311 and the valve outlet 313 is provided responsive to rotation of the globe butterfly valve disc 307 by about ninety degrees from the midpoint 323 of the hysteresis region 325 formed by the globe housing 306.

The globe butterfly valve 206 differs from a ball valve according to a number of aspects. For example, a ball valve to support a similar flow area size would be larger, heavier, and subject to a greater amount of wear due to a larger contact area as compared to the globe butterfly valve 206. As a further example, to establish a hysteresis of about 15 degrees, a corresponding ball valve would have a radius of about 16% more and a valve mass of about 211% more as compared to a mass increase of about 7% for a globe butterfly valve configuration for rotating components.

Figure 12:
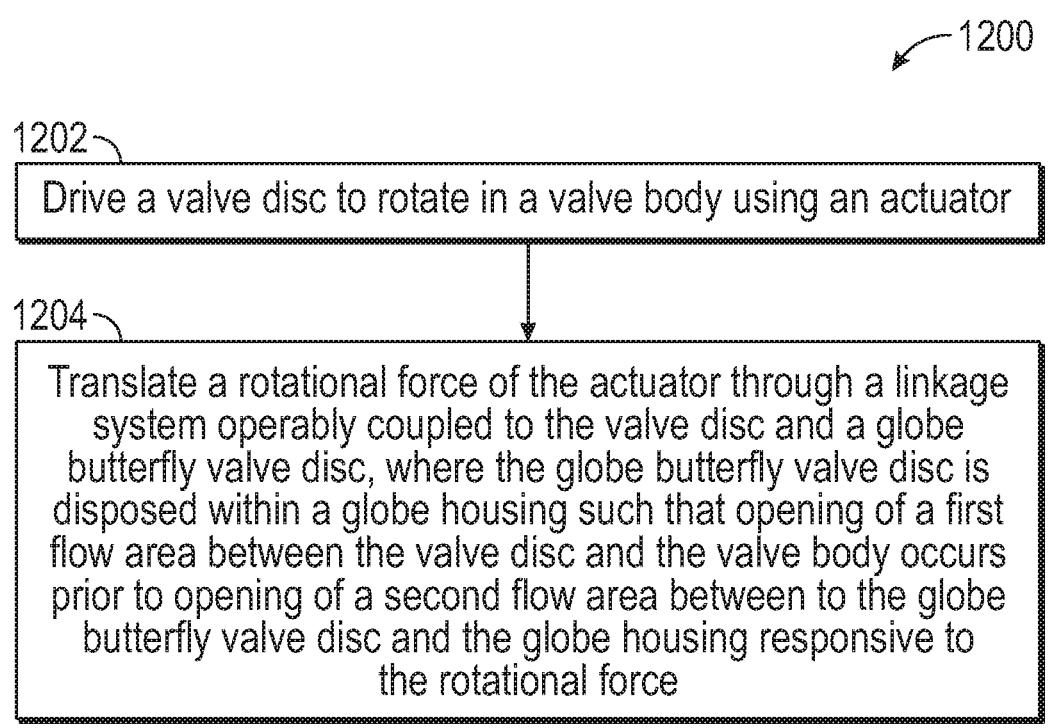
FIG. 12 is a flow chart illustrating a method, in accordance with an embodiment of the disclosure.

Referring now to FIG. 12 with continued reference to FIGS. 1-11, FIG. 12 is a flow chart illustrating a method 1200 of operating the dual valve system 202, in accordance with an embodiment. The method 1200 may be performed, for example, by the pneumatic system 200 of FIG. 2. For purposes of explanation, the method 1200 is described primarily with respect to the pneumatic system 200; however, it will be understood that the method 1200 can be performed on other configurations (not depicted).

At block 1202, the first valve disc 305 is driven to rotate in the first valve body 304 using the actuator 216. At block 1204, a rotational force of the actuator 216 is translated through a linkage system 208 operably coupled to the first valve disc 305 and a globe butterfly valve disc 307, where the globe butterfly valve disc 307 is disposed within a globe housing 306 such that opening of a first flow area 502, 702 between the first valve disc 305 and the first valve body 304 occurs prior to opening of a second flow area 504, 704 between to the globe butterfly valve disc 307 and the globe housing 306 responsive to the rotational force. The first flow area 502, 702 can control delivery of a first airflow 212 to a first airflow use 214, and the second flow area 504, 704 can control delivery of a second airflow 222 to a second airflow use 224.

While the above description has described the flow process of FIG. 12 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-

What is claimed is:

1. A gas turbine engine system comprising:
a gas turbine engine comprising a compressor section, a combustor section, and a turbine section, the gas turbine engine configured to produce a first airflow and a second airflow:
a first pneumatic tube coupled to the gas turbine engine;
a second pneumatic tube coupled to the gas turbine engine; and
a dual valve system comprising:
a valve body coupled to the first pneumatic tube;
a valve disc operably disposed within the valve body;
a globe housing comprising a spherical body coupled to the second pneumatic tube;
a globe butterfly valve disc operably disposed within the globe housing; and
a linkage system operably coupled to the valve disc and the globe butterfly valve disc, wherein the globe housing differs in geometry from the valve body such that opening of a first flow area between the valve disc and the valve body to receive the first airflow from the first pneumatic tube occurs prior to opening of a second flow area between to the globe butterfly valve disc and the globe housing to receive the second airflow from the second pneumatic tube responsive to movement of the linkage system.

2. The gas turbine engine system of claim 1, wherein the first flow area controls delivery of the first airflow to a first airflow use, and the second flow area controls delivery of the second airflow to a second airflow use.

3. The gas turbine engine system of claim 1, wherein the valve body and the globe housing are arranged substantially parallel to each other.

4. The gas turbine engine system of claim 1, wherein the globe butterfly valve disc comprises a pivot point, and the globe butterfly valve disc is operable to rotate about the pivot point within the globe housing.

5. The gas turbine engine system of claim 1, wherein the interior surface of the globe housing forms a hysteresis region of rotation that blocks the second flow area during rotation of the globe butterfly valve disc within the hysteresis region.

6. The gas turbine engine system of claim 5, wherein the second flow area is maximized responsive to rotation of the globe butterfly valve disc by about ninety degrees from a midpoint of the hysteresis region.

7. The gas turbine engine system of claim 1, wherein the globe housing is between a valve inlet and a valve outlet, the globe housing having a larger interior diameter than an inlet diameter of the valve inlet and an outlet diameter of the valve outlet.

8. The gas turbine engine system of claim 1, wherein the globe housing has a larger interior diameter than the valve body.

9. The gas turbine engine system of claim 1, wherein the valve body and the valve disc comprise a first butterfly valve, and the globe housing and the globe butterfly valve disc comprise a second butterfly valve.

10. The gas turbine engine system of claim 1, further comprising an actuator operably coupled to the linkage system.

11. The gas turbine engine system of claim 1, wherein the valve disc is configured to rotate about a first pivot point, the globe butterfly valve disc is configured to rotate about a second pivot point, and the linkage system comprises a first crank linkage operably coupled to the first pivot point of the valve disc, a second crank linkage operably coupled to the second pivot point of the globe butterfly valve disc, and an armature coupled to the first crank linkage at a third pivot point and coupled to the second crank linkage at a fourth pivot point.

12. A method of operating a dual valve system, the method comprising:
receiving a first airflow from a gas turbine engine at a first pneumatic tube coupled to a valve body of the dual valve system;
receiving a second airflow from the gas turbine engine at a second pneumatic tube coupled to a globe housing of the dual valve system;
driving a valve disc to rotate in the valve body using an actuator; and
translating a rotational force of the actuator through a linkage system operably coupled to the valve disc and a globe butterfly valve disc, wherein the globe butterfly valve disc is disposed within the globe housing and the globe housing differs in geometry from the valve body such that opening of a first flow area between the valve disc and the valve body occurs prior to opening of a second flow area between to the globe butterfly valve disc and the globe housing responsive to the rotational force.

13. The method of claim 12, wherein the valve body and the globe housing are arranged substantially parallel to each other.

14. The method of claim 12, wherein the interior surface of the globe housing forms a hysteresis region of rotation that blocks the second flow area during rotation of the globe butterfly valve disc within the hysteresis region, and the second flow area is maximized responsive to rotation of the globe butterfly valve disc by about ninety degrees from a midpoint of the hysteresis region.

15. The method of claim 12, wherein the globe housing is a spherical body between a valve inlet and a valve outlet, the globe housing having a larger interior diameter than an inlet diameter of the valve inlet and an outlet diameter of the valve outlet.

16. The method of claim 12, wherein the globe housing has a larger interior diameter than the valve body.

17. The method of claim 12, wherein the first flow area controls delivery of the first airflow to a first airflow use, and the second flow area controls delivery of the second airflow to a second airflow use.

18. The method of claim 12, wherein the valve disc is configured to rotate about a first pivot point, the globe butterfly valve disc is configured to rotate about a second pivot point, and the linkage system comprises a first crank linkage operably coupled to the first pivot point of the valve disc, a second crank linkage operably coupled to the second pivot point of the globe butterfly valve disc, and an armature coupled to the first crank linkage at a third pivot point and coupled to the second crank linkage at a fourth pivot point.

19. A method of operating a dual valve system, the method comprising:
driving a valve disc to rotate in a valve body using an actuator; and
translating a rotational force of the actuator through a linkage system operably coupled to the valve disc and a globe butterfly valve disc, wherein the globe butterfly valve disc is disposed within a globe housing and the globe housing differs in geometry from the valve body such that opening of a first flow area between the valve disc and the valve body occurs prior to opening of a second flow area between to the globe butterfly valve disc and the globe housing responsive to the rotational force, wherein the valve body and the valve disc comprise a first butterfly valve, and the globe housing and the globe butterfly valve disc comprise a second butterfly valve.

20. The method of claim 19, wherein the valve disc is configured to rotate about a first pivot point, the globe butterfly valve disc is configured to rotate about a second pivot point, and the linkage system comprises a first crank linkage operably coupled to the first pivot point of the valve disc, a second crank linkage operably coupled to the second pivot point of the globe butterfly valve disc, and an armature coupled to the first crank linkage at a third pivot point and coupled to the second crank linkage at a fourth pivot point.

* * * * *